April 1, 1941.　　　E. GRIESHABER　　　2,236,821
SOLID INJECTION ENGINE
Filed Jan. 12, 1939　　　3 Sheets-Sheet 1
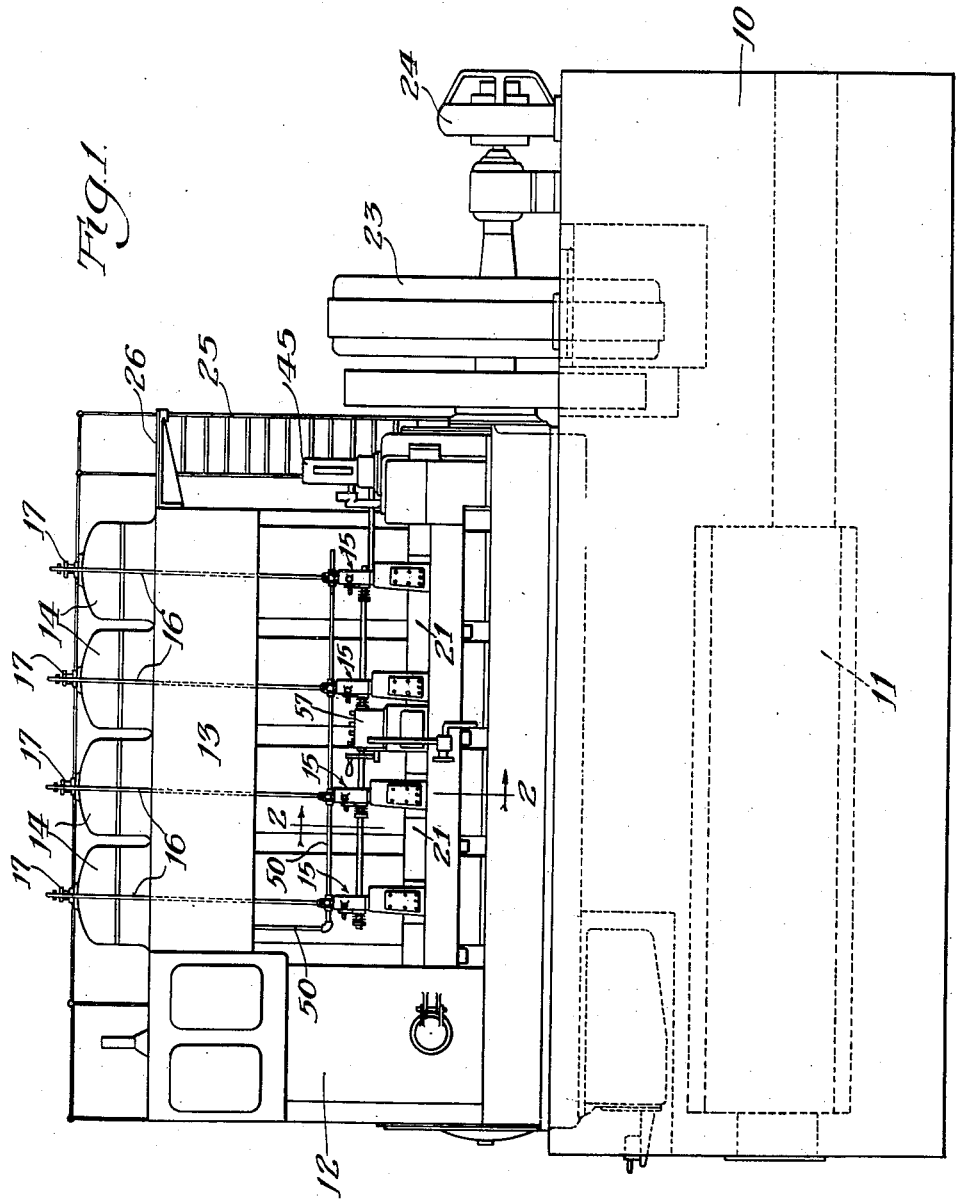
Inventor:
Emil Grieshaber,
By: (signature)
Attorney.

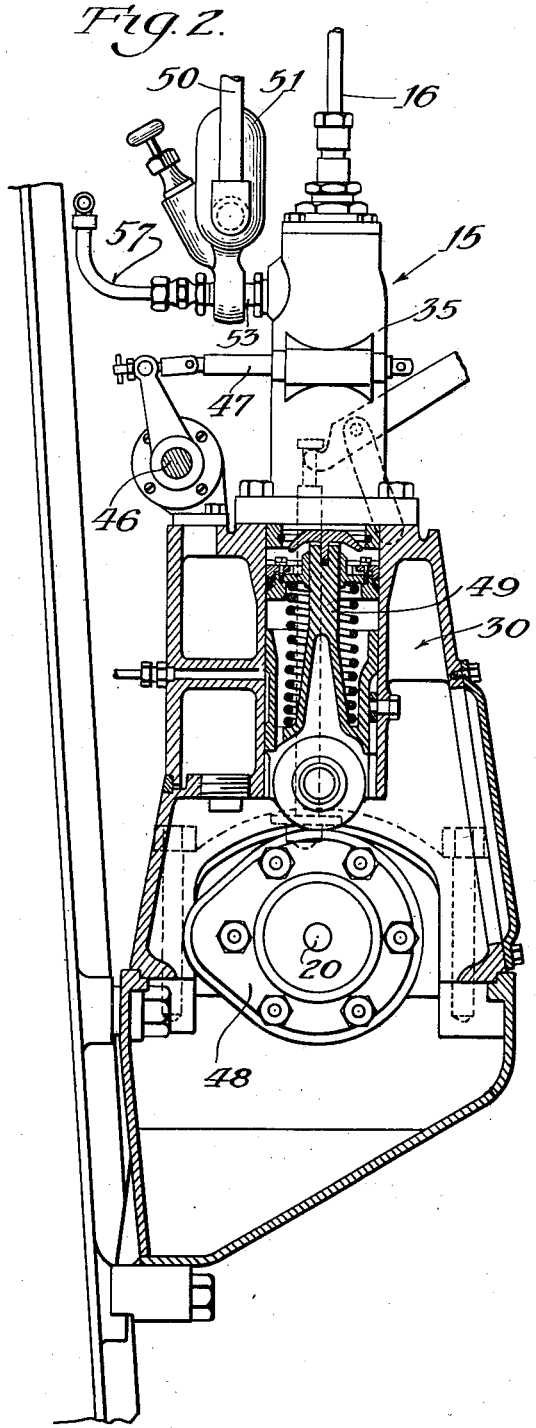
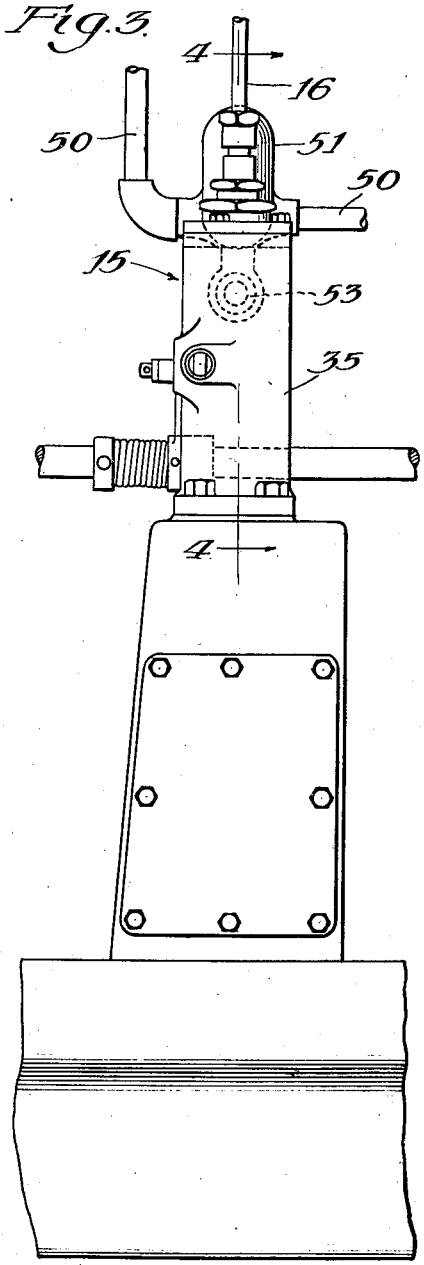

April 1, 1941.  E. GRIESHABER  2,236,821
SOLID INJECTION ENGINE
Filed Jan. 12, 1939   3 Sheets-Sheet 3
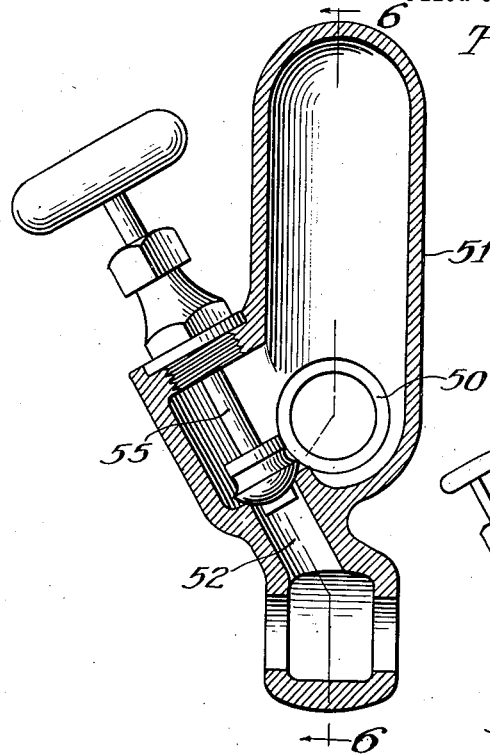
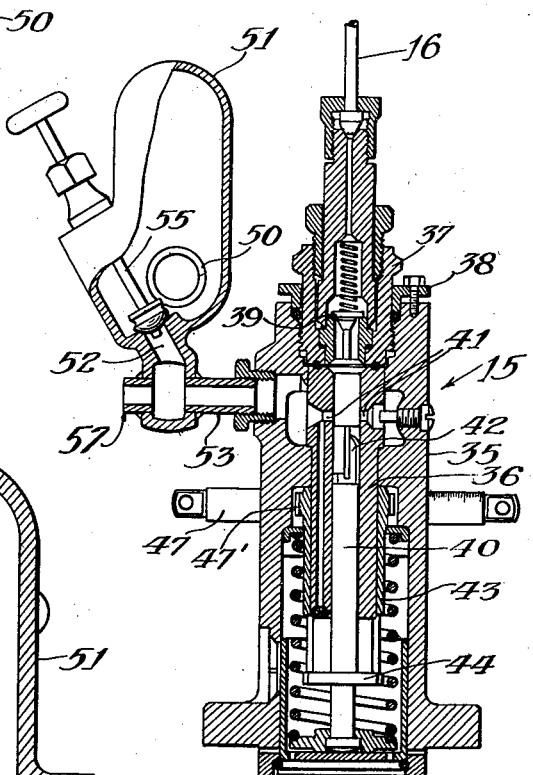
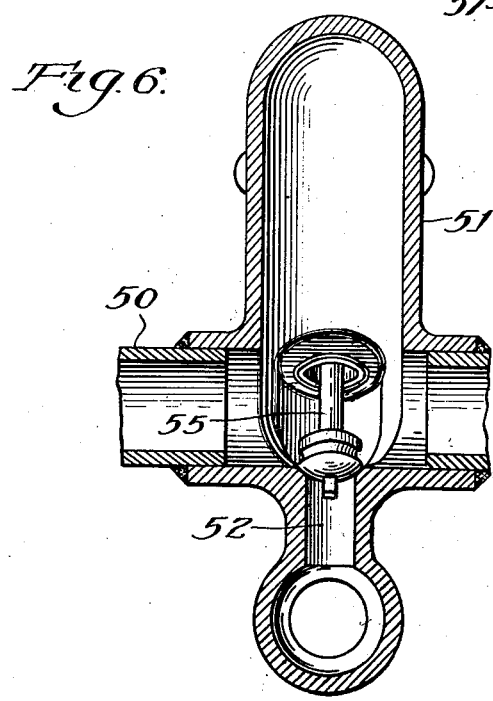
Inventor:
Emil Grieshaber,
By: Eugene W. Simpson
Attorney.

Patented Apr. 1, 1941

2,236,821

UNITED STATES PATENT OFFICE 2,236,821

SOLID INJECTION ENGINE

Emil Grieshaber, Milwaukee, Wis., assignor to Nordberg Manufacturing Company, Milwaukee, Wis., a corporation of Wisconsin Application January 12, 1939, Serial No. 250,484

7 Claims. (Cl. 123—139)

This invention relates to solid injection engines and more particularly to fuel feed systems for such engines.

In solid injection engines employing a plurality of cylinders, and a separate fuel pump for each cylinder, it has been common practice to supply fuel under pressure to the fuel pumps from a single supply pipe. Such a system is not fully satisfactory as the inertia of the oil delays the flow of oil into the pump cylinder, with the result that the pump cylinder does not completely fill during the suction stroke of the fuel pump, which causes either a loss of power or erratic performance of the engine.

One object of this invention is to provide a fuel feed system for a solid injection engine which will give a constant and full injection for each of the cylinders.

Another object is to provide a fuel injection system for a solid injection vehicle engine which will give a constant and full injection for each of the cylinders.

A further object is to provide a fuel injection system for a solid injection engine which will insure the fuel pump cylinder being completely filled on each stroke of the fuel pump.

Another object is to provide a fuel injection system for solid injection vehicle engines which will provide a constant quantity of fuel to the engine at each cycle regardless of the sway of the vehicle.

Another object is to provide a fuel injection system for solid injection vehicle engines which will overcome the natural inertia of relatively long oil supply lines.

Other objects will be apparent from the following description.

According to this invention, a separate fuel oil pump is provided for each cylinder of the engine, with a single supply pipe feeding fuel oil into separate air domes adjacent each fuel pump. On the suction stroke of the pump, the pressure of the air in the air dome acts upon the oil between the air dome and the oil pump to inject a charge of fuel into the pump cylinder.

In the drawings:

Fig. 1 is a side elevational view of a four cylinder solid injection engine, showing the fuel pumps attached thereto;

Fig. 2 is a cross-section taken on the line 2—2 of Fig. 1 looking in the direction of the arrows;

Fig. 3 is an enlarged front view of the oil pump as seen in Fig. 1;

Fig. 4 is a cross-section on the line 4—4 of Fig. 3, looking in the direction of the arrows;

Fig. 5 is an enlarged view of the air dome shown in Figs. 2, 3 and 4; and

Fig. 6 is a cross-section on the line 6—6 of Fig. 5, looking in the direction of the arrows.

Referring to the drawings, in which like numerals indicate like parts throughout the several views, the engine shown has four cylinders, although it is to be understood that the present invention will function equally well on any solid injection engine.

The engine shown in Fig. 1 is mounted on a foundation 10 in which is built a muffler 11 for the intake of a scavenging air pump 12. The scavenging air pump supplies air to a scavenging header 13 which delivers the air to cylinders 14 to aid in completely ridding the cylinders of burnt gases.

Fuel oil is supplied to the cylinders 14 by fuel pumps, generally designated 15, which pump the oil under high pressure through fuel feed pipes 16 and into the engine cylinders 14 through fuel injection valves 17. The fuel pumps are driven from a countershaft 20 (Fig. 2), encased in a housing 21 (Fig. 1).

The engine shown in Fig. 1 may drive a generator 23 and an exciter 24 or other power load.

A stairway 25 leads to a platform 26 adjacent the top of the cylinders 14 to facilitate repairs and adjustments to the engine.

The details of the fuel injection system are shown in Figs. 2 to 6, inclusive. Referring to those figures, Fig. 4 shows most clearly the details of the pumping head 15, while Fig. 2 shows most clearly the details of the driving mechanism 30 of the pump 15.

Referring to Fig. 4 the oil pumping head 15 is composed of an outer casing 35 which mounts a cylinder 36. The cylinder 36 is held in the casing 35 by a hollow cap screw 37 and leakage of fuel oil past the cap screw is prevented by a packing washer 38.

The interior of the cap screw 37 mounts an exhaust valve 39 which leads to the fuel feed pipes 16 heretofore mentioned.

A piston 40 reciprocates in the cylinder 36 forcing oil received through ports 41 out through the exhaust valve 39 to supply the fuel to the engine cylinders 14.

The side of the piston 40 is cut away to form a recess 42 which provides a means to regulate the quantity of fuel oil delivered to the engine cylinders 14. The recess 42 is in communication with the area above the top of the cylinder, so that when the recess comes opposite the ports 41 pressure is relieved in the cylinder and no further pumping occurs. The time at which the recess 42 comes opposite the ports 41 is governed by a sleeve 43 which engages a cross-head 44 on the piston to turn the latter.

The positions of the recesses 42 on all the pumps 15 in the engine shown are regulated simultaneously and automatically through a governor 45 (Fig. 1) so as to give constant speed to the engine regardless of load. The governor 45 turns a shaft 46 which moves racks 47. The racks 47 engage gears 47' on the sleeves 43 to adjust the angular position of the pistons 40.

The piston 40 is operated from a cam 48 through a cross-head and plunger 49, shown in Fig. 2.

Referring to Figs. 4, 5 and 6, the fuel oil is supplied under constant air pressure to the pumps 15 through an oil feed pipe 50 which supplies all of the fuel pumps. The pipe 50 opens into successive air domes 51 situated immediately adjacent the oil pumps 15. Each air dome 51 has a port 52 to one side thereof opening into a nipple 53 fixed in the casing 35 adjacent the port 41. The port 52 is controlled by a pet cock 55 so that flow of oil to each individual engine cylinder may be controlled.

In the event that the engine runs at a dangerous speed, the governor 45 opens a valve (not shown) which admits air through a pipe 57 into the fuel pump 15, causing the engine to stop and thus avoiding damage due to excessive speed.

Operation

In operation oil is supplied under pressure through the pipe 50 to the successive air domes 51 adjacent the pumps 15. As the oil under pressure rises in the air domes 51 air is trapped in the space above the oil and is compressed by the oil pressure to the same static pressure as the oil.

When the fuel pump piston 40 is withdrawn, uncovering the ports 41, the pressure of the air in the domes 51 causes the oil to be forced from the air dome through the passage 52 and the nipple 53 into the cylinder 36.

The air domes 51 eliminate the inertia of the usual long column of oil in the feed pipe by providing a short column extending from the top of the oil surface in the air domes 51 to the pump cylinders 36. This short column moves rapidly under the influence of the air pressure in the air domes 51 and provides for a very rapid filling of the fuel pump cylinders 36 thus eliminating the inertia of the long column.

The rapid movement of the oil from the air domes into the cylinders 36 of the oil pumps causes a complete and uniform filling of the fuel pump cylinders 36 and hence a uniform injection into the engine cylinders 14.

The individual air domes adjacent each cylinder adapt the engine for ships or other vehicles as no ordinary tipping or swaying is likely to allow air from the domes 51 to enter the fuel pump cylinders 36 to interrupt the operation of the engine.

It will be understood that the invention is not limited to the details of construction shown in the drawings and that the phraseology employed in the specification is for the purpose of description and not of limitation.

The invention is hereby claimed as follows:

1. In a fuel feed system for a solid injection engine, a fuel pump, an air dome connected with the inlet of said fuel pump, means to lead oil from the bottom of said air dome and deliver the same to said pump, a control valve in said means, to shut off the flow of oil therethrough, and a supply pipe opening into said air dome to supply oil thereto.

2. In a fuel feed system for solid injection engines having a plurality of cylinders, a fuel pump adjacent each of said cylinders, an air dome connected with the inlet of each of said fuel pumps, means to supply fuel oil to each of the fuel pumps from the lower portion of the adjacent air dome, and a fuel supply line passing through each of said air domes successively.

3. In a fuel feed system for solid injection engines having a plurality of cylinders, a fuel pump adjacent each of said cylinders, an air dome connected with the inlet of each of said fuel pumps, means to supply fuel oil to each of the fuel pumps from the lower portion of the adjacent dome, and a fuel supply pipe opening into each of said air domes successively above said means.

4. In a fuel feed system for a solid injection engine, a fuel pump, an air dome mounted at the inlet of said fuel pump, fuel conducting means adapted to deliver fuel from said air dome to the inlet of said fuel pump, and a pipe adapted to deliver fuel oil to said air dome at a point above said fuel conducting means.

5. In a fuel feed system for a solid injection engine, having a plurality of cylinders, a fuel pump adjacent each of said cylinders, an air dome connected with the inlet of each of said fuel pumps, means to supply fuel oil to each of the fuel pumps from the lower portion of the adjacent air dome, means to control the flow of fuel to each pump individually, and a fuel line passing through each of said air domes successively.

6. In a fuel feed system for a solid injection engine, having a plurality of cylinders, a fuel pump adjacent each of said cylinders, an air dome connected with the inlet of each of said fuel pumps, means to supply fuel oil to each of said fuel pumps from the lower portion of the adjacent dome, means to control the flow of fuel to each pump individually, and a fuel supply pipe opening into each of said air domes successively above said means.

7. In a fuel feed system for a solid injection engine, a single cylinder fuel pump, an air dome mounted at the inlet of said fuel pump, fuel conducting means adapted to deliver fuel from said air dome to the inlet of said fuel pump, and a pipe adapted to deliver fuel oil to said air dome at a point above said fuel conducting means.

EMIL GRIESHABER.